(12) United States Patent
Van Ommering

(10) Patent No.: US 7,137,125 B2
(45) Date of Patent: Nov. 14, 2006

(54) METHOD OF CONTROLLING AN ARRANGEMENT OF HARDWARE COMPONENTS

(75) Inventor: Robbert Christiaan Van Ommering, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 535 days.

(21) Appl. No.: 09/982,241

(22) Filed: Oct. 17, 2001

(65) Prior Publication Data

US 2002/0073250 A1    Jun. 13, 2002

(30) Foreign Application Priority Data

Oct. 17, 2000    (EP) .................................. 00203606

(51) Int. Cl.
  *G06F 13/00*    (2006.01)
  *G06F 13/14*    (2006.01)
  *G06F 13/10*    (2006.01)
  *G06F 9/54*    (2006.01)
(52) U.S. Cl. ...................................... 719/321; 719/313
(58) Field of Classification Search ................ 719/313, 719/310–332
    See application file for complete search history.

(56) References Cited

U.S. PATENT DOCUMENTS

| | | | | |
|---|---|---|---|---|
| 4,698,766 A | * | 10/1987 | Entwistle et al. | ............. 700/96 |
| 5,386,568 A | * | 1/1995 | Wold et al. | ................. 717/162 |
| 5,956,023 A | * | 9/1999 | Lyle et al. | ................... 345/771 |
| 6,160,548 A | * | 12/2000 | Lea et al. | .................... 715/723 |
| 6,212,574 B1 | * | 4/2001 | O'Rourke et al. | .......... 719/321 |
| 6,389,483 B1 | * | 5/2002 | Larsson | ...................... 719/313 |
| 6,499,062 B1 | * | 12/2002 | Shteyn | ....................... 719/315 |
| 6,738,964 B1 | * | 5/2004 | Zink et al. | .................. 717/105 |
| 6,918,123 B1 | * | 7/2005 | Shteyn | ....................... 719/318 |

FOREIGN PATENT DOCUMENTS

| | | |
|---|---|---|
| EP | 0271945 B1 | 6/1988 |
| EP | 0871114 A2 | 1/2000 |
| EP | 1024661 A2 | 1/2000 |

OTHER PUBLICATIONS

Coulson, Geoff et al. "Supporting Continuous Media Applications in a Micro-Kernel Environment." 1994.*
Microsoft Press. "Microsoft Computer Dictionary." Fourth Edition, 1999, p. 429.*

* cited by examiner

*Primary Examiner*—Lewis A. Bullock, Jr.
(74) *Attorney, Agent, or Firm*—Michael E. Belk; Paul Im

(57) ABSTRACT

A method of controlling an arrangement of a plurality of hardware components, at least some of which are coupled to one another via signal leads, by means of a data processing unit in which there is executed a computer program which comprises sub-modules which correspond to the hardware components and are connected via data channels in conformity with the real signal leads between the hardware components. The software thus exactly duplicates the hardware structure and ensures that information flows horizontally and is always present in the relevant location. Moreover, the software can be simply and flexibly adapted to changes of the configuration of existing hardware components.

20 Claims, 2 Drawing Sheets

METHOD OF CONTROLLING AN ARRANGEMENT OF HARDWARE COMPONENTS

The invention relates to a method of controlling an arrangement of a plurality of hardware components, at least some of which are coupled to one another via signal leads, by means of a data processing unit and a computer program which is executed therein. The invention also relates to a data and signal processing device, such as notably a television set, a video recorder, a set top box or an audio apparatus with a plurality of hardware components, at least some of which are coupled to one another via signal leads, and also with a data processing unit which serves to control the hardware components and in which a computer program can be executed.

Contemporary electronic apparatus for different fields of application generally are based on an arrangement with a plurality of separate hardware components that are capable of exchanging signals via appropriate signal leads. Such hardware components are often controlled and coordinated by at least one data processing unit (microcomputer, microcontroller) which can access the hardware components via appropriate interfaces and in which a computer program is executed so as to execute the control tasks.

Examples of systems of this kind are notably television sets, video recorders, set top boxes (decoder unit for taking up the cable connection in an interactive multi-medial communication concept) or audio apparatus. The computer programs for controlling such apparatus are usually structured such that a special software driver is formed for each hardware component, said driver communicating on the one side with the respective hardware component and on the other side with a higher ranking software module. This results in hierarchical software structures in which modules of a higher level control an increasing number of software components, and hence also hardware components, of lower ranking stages. A system thus structured is known, for example, from U.S. Pat. No. 5,956,023 which relates to a medical apparatus for the automatic processing of blood and other fluids. The control of this apparatus, taking place at a higher software level, is separated from the hardware components of the apparatus via an instrument manager. Information to and from the hardware components in such apparatus is transported vertically through the hierarchical system. This has the drawback that information that has been acquired in a first hardware component and is required by another hardware component must be transported through software components at higher levels, in the worst case even of the highest level. This is the case even when the information is of no or hardly any significance to the higher levels (low-level information).

Another approach that is frequently followed consists in providing a layer of "physical apparatus drivers" which directly control the hardware components and in providing on top of this layer a layer of "logic apparatus drivers" which each control a respective aspect of the hardware. This solution again has the drawback that even the simplest change in the linking of the hardware components necessitates non-trivial modifications in the control software. This additional work represents a significant problem in fields such as the manufacture of TV sets where in the course of a year many different products are produced by different combinations of the same hardware components.

U.S. Pat. No. 4,698,766 discloses an automated processing and manufacturing arrangement in which a plurality of computers control machines, tools, conveyer belts and storage devices. The control software for these computers is divided into various modules that serve to execute elementary functions and process the signals of the connected hardware components at a higher level.

EP 0 271 945 B1 discloses a database system with a plurality of sub-systems that are capable of producing and/or processing different types of data. Information is exchanged between the sub-systems via interfaces which are coupled to a common bus as well as via the classification according to type of the data to be transferred. In the case of a communication each sub-system states the data type of the requested or presented information and transmits or receives the appropriate information in response thereto. Consequently, the sub-system need not know the configuration of the overall system, and notably not the address of another sub-system wherefrom it requests information or whereto it transmits information. Correct assignment of the information takes place instead via the data type that is stated at the same time.

It is an object of the present invention to provide a flexible method of controlling a plurality of hardware components and also a data and signal processing device with a plurality of hardware components that can be comparatively simply adapted to a modification of the configuration of the hardware components.

This object is achieved by means of a method as claimed in claim 1 and by means of a data and signal processing device as claimed in claim 5. Advantageous embodiments are disclosed in the dependent claims.

The method of controlling an arrangement of a plurality of hardware components, at least some of which are coupled to one another via signal leads, while utilizing a computer program that is executed in a data processing unit having access to the hardware components is characterized in that the computer program comprises sub-modules which correspond to the hardware components and are connected via data channels in conformity with the real signal leads between the hardware components. The software that executes the control, that is, the monitoring, control and/or regulating of the hardware components, thus accurately copies the construction of the hardware components and their linking in respect of the signal and information flow. In the case of a modification of the hardware configuration, therefore, the control software can be adapted in a simple manner, because the sub-modules involved remain the same and only the linking of the data channels need be modified in conformity with the new linking of the hardware components. The communication in the data channels themselves, however, may remain the same. The structuring of the control software in accordance with the invention also ensures that the information required in any part of the device is always and immediately available in the relevant part.

In the case of a dynamic modification of the hardware components and/or the signal leads therebetween, the sub-modules of the computer program for controlling the hardware components and/or the data channels between the sub-modules are dynamically adapted accordingly. The mirroring of the hardware structure in the software structure in accordance with the invention is thus maintained in a dynamic process.

For simplification and standardization of the programming work, the data channels via which the sub-modules exchange information may all utilize the same communication protocol. In conformity with this protocol, for example, the validity of a transmitted signal may be reported, or all hardware switches can be controlled when connections are established between sources and destinations; it can also be defined which signal properties can be measured, and these measurements can be communicated to all parts involved.

The hardware components that are controlled by the software may constitute the overall apparatus, (printed) circuit boards, layout cells, microchips and/or core cells. In the order mentioned these hardware components represent a hierarchical structure which is reflected as such in a hierarchical structure of the software modules.

The invention also relates to a data and signal processing device that includes a plurality of hardware components, at least some of which are coupled to one another via signal leads, and also a data processing unit which serves to control the hardware components and in which a computer program can be executed. The data and signal processing device is characterized in that the computer program comprises sub-modules which correspond to the hardware components and are connected via data channels in conformity with the real signal leads between the hardware components. The software for controlling the data and signal processing device thus comprises horizontally extending data communication channels between the software modules that drive the hardware. Such data channels correspond exactly to the data flow in the hardware and transport the information corresponding to the hardware signals to exactly the correct locations, that is, the correct sub-modules. When the hardware configuration is modified, the software configuration need merely be adapted in respect of the data channels in order to obtain a control system adapted to the new hardware configuration. This is also the case when the hardware configuration changes dynamically, for example, due to the changing of switch positions.

The data and signal processing device may notably be a television set, a video recorder, a set top box or an audio apparatus. Apparatus of this kind is characterized by the fact that they comprise a large number of hardware components which must be managed via control software, and that they are implemented in frequently changing configurations of hardware components that themselves remain the same, thus necessitating frequent adaptation of the control software.

In the case of a television set that is implemented as an example of a data and signal processing device in accordance with the invention, the software sub-modules can be defined so as to correspond exactly to the composition of the apparatus in terms of hardware. This means that in principle there are software sub-modules for the housing or the overall apparatus, for each printed circuit board, for each layout cell, for each chip and for each core cell. Each software sub-module has input channels and output channels which, in respect of the signals and the connections, correspond exactly to the inputs and the outputs of the hardware. The data communication channels of the software preferably operate with a standardized protocol (IMgSignal/Notify). Using this protocol, the validity of a signal can be reported, hardware switches which establish connections between sources and destinations can be controlled, the type of signal properties to be measured can be defined, and the values of these measurements can be applied to all components involved.

The invention offers the advantage that control software for various versions of the apparatus, realized by way of different connections of the standard hardware components, can be implemented simply by connecting the software sub-modules in conformity with the hardware. The method in accordance with the invention can also be used in cases where the signal processing units are implemented essentially by software. In that case the control information can be transferred via a separate data channel or be superposed on the information flow of the software.

The invention will be described in detail hereinafter with reference to the Figures. Therein:

The Figures illustrate the method in accordance with the invention on the basis of the horizontal communication during the control of hardware components in a television set. The hardware components are controlled by software components which relate one to one to the hardware components. Peer-to-peer (and bidirectional) communication between the software components can then be used to implement the necessary co-ordination between the hardware components.

Figure 1:
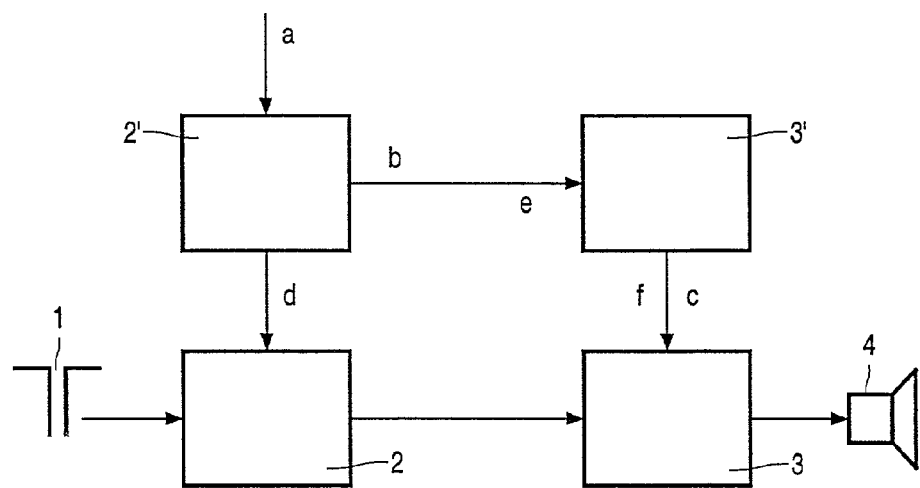
FIG. 1 shows the diagram of hardware control in a TV set which includes a tuner.

The arrangement shown in FIG. 1 involves two hardware components to be controlled, that is, a tuner 2 and a high-end output processor (HOP) 3 which is connected thereto. The tuner 2 converts signals from an antenna 1 into a baseband signal which is subsequently amplified by the HOP 3 so as to drive the picture tube 4. The two hardware components 2 and 3 are controlled by two software components 2' and 3' with a peer-to-peer connection to the components.

The execution of the method in accordance with the invention will now be described on the basis of an example involving a change of channel. In order to avoid visual artefacts on the screen 4 when the channel is changed, the image must be blanked in the HOP 3 before the frequency is changed. After the tuner 2 has stabilized, the image can be displayed again. These tasks customarily are performed by a hierarchy of software components; this has the drawback that a low-level detail, that is, the blanking of the image, becomes visible at the top of the hierarchy. It is to be noted that numerous other devices may be present between the tuner and the HOP. In accordance with the invention, however, the task is performed by horizontal communication.

The method commences with a command a for frequency adjustment. After having received this command, the tuner controller 2' sends the command Drop Request b via its software output. This output is connected to the software input of the HOP controller 3' which subsequently applies the command Blank Image c to the HOP 3. When the Drop Request command returns, the tuner controller 2' can change the tuner output signal by applying a command Set Frequency d to the tuner 2. Subsequently, the tuner controller 2' sends a command Restore e via its software output; the HOP controller 3' interprets this command as a signal to enable the image display again and it applies a command Unblank Image f to the HOP 3 for this purpose.

If, as opposed to the situation shown in FIG. 1, a chain of devices is involved, each device should respond to a Drop Request command b by passing on this command to its downstream neighbors and by halting its own processing of the signal. In response to a Restore command e, each device should resume the processing of the signal again and pass on the Restore command to its downstream neighbors.

The described protocol can be improved in various ways. On the one hand, it may be that not all downstream devices can accept a Drop Request command immediately. For example, a picture-in-picture component which converts an input image into a smaller output image must complete the processing of a full image, because otherwise visual artefacts may occur. In order to deal with such situations, it is permissible to delay the Drop Request command by returning "false" (instead of "true"). The device then has the responsibility to send a Drop Acknowledge command upstream at a later stage in order to signal that the operation can then take place. Intermediate devices can return a "true" only if they themselves and all downstream devices can accept the Drop Request command immediately. Even if only one of the downstream devices delays the Drop Request command, a Drop Acknowledge signal will follow later and the intermediate device must pass on this signal upstream.

A further improvement concerns the Restore command. This command can also be delayed, for example, if the tuner requires a given period of time for its output signal to become stable.

Figure 2:
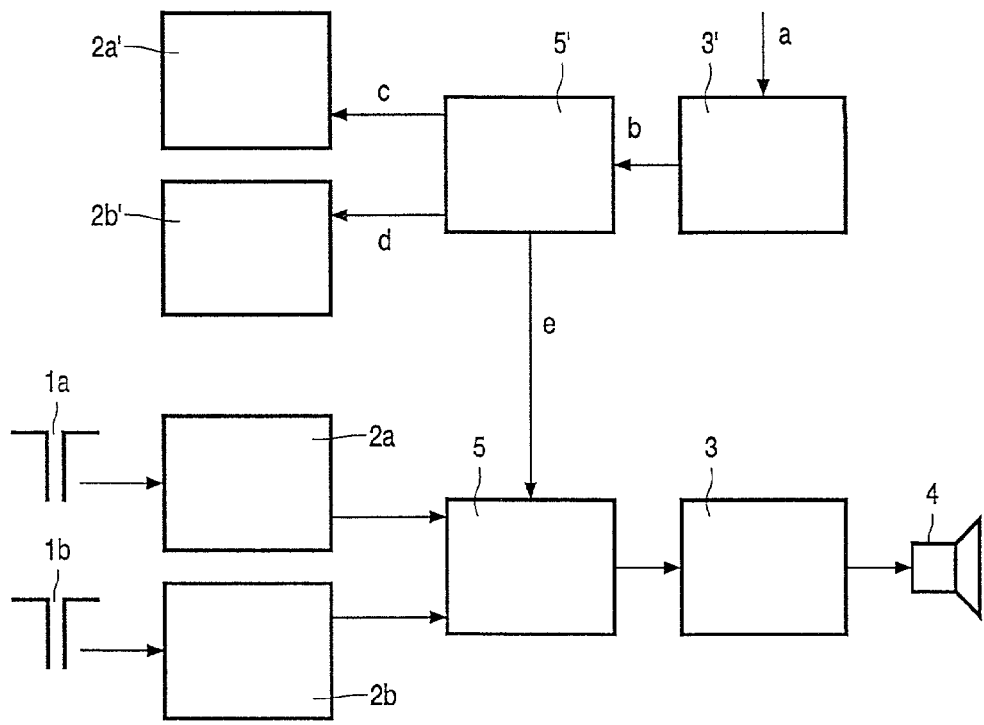
FIG. 2 shows an arrangement extended with a further tuner in comparison with FIG. 1.

FIG. 2 shows a second part of the protocol in accordance with the invention for source selection. In contrast with FIG. 1, FIG. 2 shows two tuners 2a and 2b which are connected to a respective antenna 1a and 1b and to a single HOP 3 via a switch 5. Either the tuner 2a or the tuner 2b can be selected via the switch 5. In conformity with the concept of the invention, a controller module in the software is associated with each hardware component, which means that there are two tuner controllers 2a' and 2b' and also a switch controller 5'. The switch controller 5' is an example of an intermediate device which must pass on Drop Request, Acknowledge and Restore commands as described above.

The switch 5 in customary apparatus is controlled directly by software of a higher level. However, two problems arise: on the one hand the higher software level must know the topology of the network (which is not a trivial matter in the case of real products) and on the other hand visual artefacts could occur when a switch is switched over, so that downstream devices must interrupt the signal processing.

In order to solve the first problem, a simple tree search is implemented in the protocol. The command Connect can be called in the HOP controller 3', the desired signal source (tuner 2a or 2b) being stated as the parameter. The HOP controller 3' then calls Connect b on its software inputs. The switch controller 5'requests Connect c, d on each of its inputs; only one of the inputs e will then return "true", because each of the connected sources 2a, 2b has an unambiguous identification ID, so that only one tuner will respond.

The switch 5 sets itself to the correct position. However, before doing so it issues a Drop Request command via its output, so that the above-mentioned second problem (visual artefacts) is also solved. A Restore command is given after the switching over of the switch.

Figure 3:
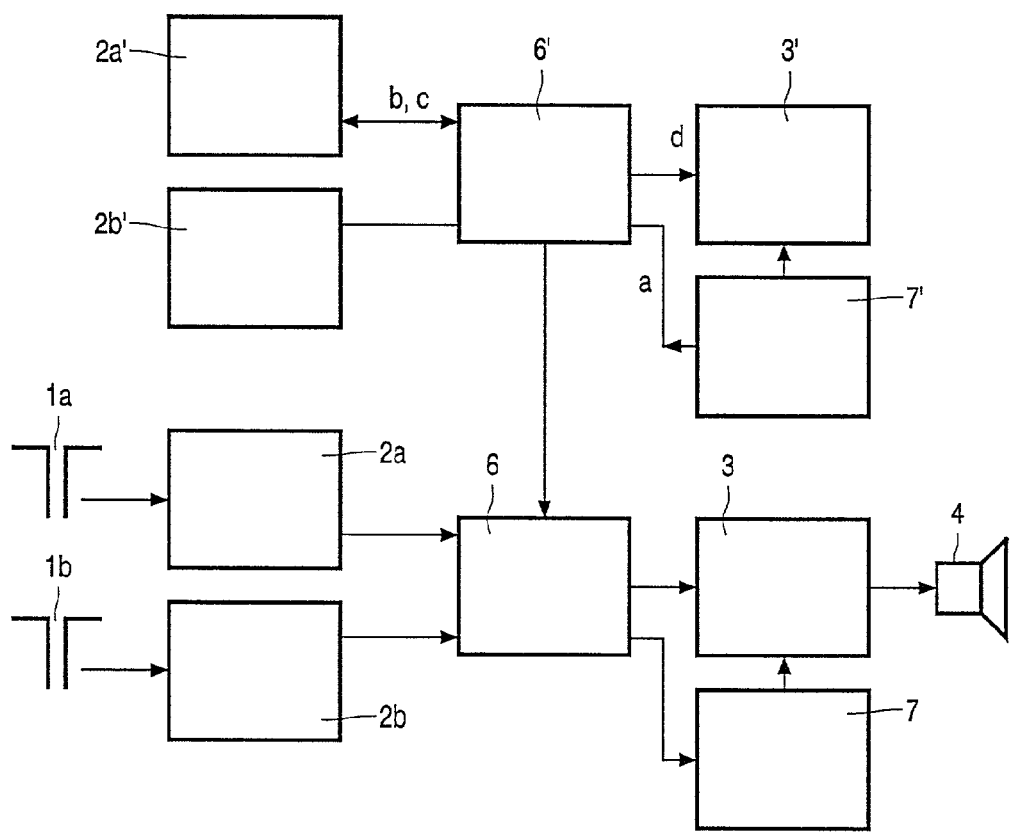
FIG. 3 shows an arrangement extended with a teletext processing unit in comparison with FIG. 2.

FIG. 3 shows a third and a fourth part of the protocol which concern the exchange of capability and property information. A property is defined as an attribute of a signal measured at one location and used at another location.

The arrangement of FIG. 3 comprises two tuners 2a and 2b, a switching matrix 6, a HOP 3 and a teletext processing unit 7. The teletext processing unit 7 is capable of displaying teletext pages, via the HOP 3, and of preparing information concerning a signal. The signal may indicate, for example, whether the aspect ratio is 4:3 or 16:9.

When the teletext processing device 7 is connected to the same tuner as the HOP 3, the information concerning the aspect ratio is available. However, when the teletext processing device 7 is used to watch teletext information of a different channel, the aspect ratio information is not available. In accordance with the concept of the invention a corresponding software component is associated with each hardware component. Thus, the software of the arrangement shown in FIG. 3 comprises two tuner controllers 2a' and 2b', a matrix controller 6', a HOP controller 3' and a teletext controller 7'. When the teletext controller 7' detects a change in the aspect ratio of the signal, it sends a command Prop Changed a upstream. The matrix controller 6' conducts this command to the associated tuner controller (b). The tuner controller responds by sending the command downstream to all controllers of devices that are connected to the tuner. All device controllers thus receive information concerning the signal processed by these devices.

If the signals change, for example due to a change of frequency or to the switching over of switches or matrices, it will generally take some time until new measurements become available. This implies that, in addition to the property values, the validity of the values (measured or (not yet) measured) must be reported. Moreover, since not all measurements can be performed at all times, the capability of measuring a given property (yes/no) must be reported. For example, if the teletext processing device 7 is connected to the tuner 2b and the HOP 3 is connected to the tuner 2a, no information on the aspect ratio is available to the HOP.

The horizontal communication concept as described above can be used to deal with the presence/absence of signals, to establish connections and to distribute information concerning the measurement of signal properties. These tasks can also be implemented in a conventional way by using a hierarchical control system, but such an approach has two drawbacks:

in topologies involving many switches, the hierarchical programming of the control becomes cumbersome and very difficult to carry out correctly;

when a large number of products is manufactured in a short period of time, each product having its own topology, the hierarchical programming of the control becomes a critical factor in the development.

The horizontal communication approach reduces the software programming activity to a simple composition of re-usable software components, provided that the corresponding hardware activity is also a simple composition of re-usable hardware devices. When new hardware devices are developed, it is also necessary to develop new software components. However, because the hardware development takes time and the software development can be executed in parallel, such software development no longer has a critical effect on the development path.

The invention claimed is:

1. A method of controlling an arrangement of a plurality of hardware components, at least some of which are coupled to one another via signal leads, by means of a data processing unit and a computer program which is executed therein, characterized in that the computer program comprises sub-modules which correspond to the hardware components and are connected via data channels in conformity with the real signal leads between the hardware components wherein the sub-modules of the computer program and/or the data channels between the sub-modules are adapted in conformity with the dynamic changing of the hardware components and/or the signal lends between the hardware components.

2. A method of controlling an arrangement of a plurality of hardware components, at least some of which are coupled to one another via signal leads, by means of a data processing unit and a computer program which is executed therein, characterized in that the computer program comprises a plurality of sub-modules which correspond to the hardware components and are connected via data channels in conformity with the real signal leads between the hardware components, and wherein communication occurs between the sub-modules to control the hardware components.

3. A method as claimed in claim 2, characterized in that all data channels utilize the same communication protocol.

4. A method as claimed in claim 2, characterized in that the hardware components are printed circuit boards, layout cells, microchips and/or core cells.

5. A method as claimed in claim 2, wherein at least one of the hardware components is a tuner.

6. A method as claimed in claim 5, wherein at least one other of the hardware components is an output device operatively coupled to the tuner.

7. A method as claimed in claim 6, wherein communications occur between the sub-modules to prevent output of the output device for a period of time.

8. A method as claimed in claim 7, wherein there is at least another tuner operatively connected to the output device through a switching device and wherein communications occur between the sub-modules to prevent output of the output device for a period of time via the switching device.

9. A data and signal processing device which includes a plurality of hardware components, at least some of which are coupled to one another via signal leads, and also a data processing unit which serves to control the hardware components and in which a computer program can be executed, characterized in that the computer program comprises a plurality of sub-modules which correspond to the hardware components and are connected via data channels in conformity with the real signal leads between the hardware components, and wherein communication occurs between the sub-modules to control the hardware components.

10. A data and signal processing device as claimed in claim 9, characterized in that it is a television set, a video recorder, a set top box or an audio apparatus.

11. A data and signal processing device as claimed in claim 10, characterized in that the sub-modules have inputs and outputs which correspond to input and outputs for the hardware components.

12. A data and signal processing device as claimed in claim 11, characterized in that hardware switches can establish connection through the inputs and outputs to the sub-modules and the hardware components.

13. A data and signal processing device as claimed in claim 9, wherein at least one of the hardware components is a tuner.

14. A data and signal processing device as claimed in claim 13, wherein at least one other of the hardware components is an output device operatively coupled to the tuner.

15. A data and signal processing device as claimed in claim 14, wherein communications occur between the sub-modules to prevent output of the output device for a period of time.

16. A data and signal processing device as claimed in claim 15, wherein there is at least another tuner operatively connected to the output device through a switching device.

17. A data and signal processing device as claimed in claim 16, wherein communications occur between the sub-modules to prevent output of the output device for a period of time via the switching device.

18. A data and signal processing device, which includes a plurality of hardware components, at least some of which are coupled to one another via signal leads, and also a data processing unit which serves to control the hardware components and in which a computer program can be executed, characterized in that the computer program comprises sub-modules which correspond to the hardware components and are connected via data channels in conformity with the real signal leads between the hardware components, wherein the data and signal processing device is a television set, a video recorder, a set top box or an audio apparatus, the sub-modules have inputs and outputs which correspond to input and outputs for the hardware components and further characterized in that a signals' validity can be reported through the inputs and outputs to the sub-modules and the hardware components.

19. A data and signal processing device, which includes a plurality of hardware components, at least some of which are coupled to one another via signal leads, and also a data processing unit which serves to control the hardware components and in which a computer program can be executed, characterized in that the computer program comprises sub-modules which correspond to the hardware components and are connected via data channels in conformity with the real signal leads between the hardware components, wherein the data and signal processing device is a television set, a video recorder, a set top box or an audio apparatus, the sub-modules have inputs and outputs which correspond to input and outputs for the hardware components and further characterized in that a signals' properties can be defined through the inputs and outputs to the sub-modules and the hardware components.

20. A data and signal processing device as claimed in claim 19, characterized in that the signals' defined properties can reported to all hardware components through the inputs and outputs to the sub-modules and the hardware components.

* * * * *